Jan. 29, 1957 M. ZUCKERMAN Re. 24,268

DELAY SWITCH

Original Filed Nov. 29, 1951

INVENTOR.
Milton Zuckerman
BY
Alvin R. Swern
his ATTORNEY

United States Patent Office

Re. 24,268
Reissued Jan. 29, 1957

24,268

DELAY SWITCH

Milton Zuckerman, Brooklyn, N. Y.

Original No. 2,658,975, dated November 10, 1953, Serial No. 258,883, November 29, 1951. Application for reissue July 25, 1955, Serial No. 524,313

9 Claims. (Cl. 200—122)

Matter enclosed in heavy brackets [ ] appears in the original patent but forms no part of this reissue specification; matter printed in italics indicates the additions made by reissue.

This invention relates to delay switches.

Delay switching mechanisms have heretofore been dominated by varied forms of the conventional clock escapement mechanisms and synchronous motor mechanisms. The aforesaid units are expensive to manufacture, cumbersome in size, and subject to stoppage and/or inaccuracy because of dust or dirt accumulations within the moving parts of the individual mechanisms. The conventional clock escapement mechanism has further disadvantages in that variations in ambient temperature adversely affect the operation of the unit.

It is an object of the present invention to provide [a] *an improved* delay switch which is compact in structure, inexpensive to manufacture and positive in action.

It is a further object of the invention to provide [a] *an improved* delay switch wherein the effects of ambient temperature are minimized.

It is a further object of the invention to provide [a] *an improved* switch wherein variations of applied line frequency of the electrical current operating the device may be limited.

Other objects and advantages of the invention will be apparent to those skilled in the art after a reading of the following specification and the claims.

In general, the invention comprises a thermally operated device, electrically actuated, and enclosed in an evacuated or inert gas filled envelope, as hereinafter described with reference to the accompanying drawings, wherein—

Similar reference characters are utilized in the above described views, to indicate corresponding parts.

Figure 1:
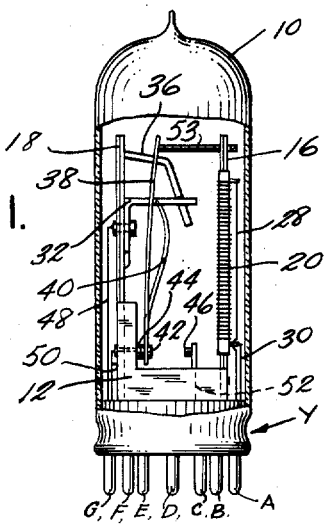
Figure 1 is a plan view, with the sealed envelope shown partially in section, of one structure embodying the invention.

Referring to the drawing in detail, character 10, represents a sealed envelope, preferably formed from a hard glass such as Nonex or Pyrex. Several connector pin leads of a conductive material known to the art and illustrated as A, B, C, D, E, F and G are sealed through the envelope wall to provide means for obtaining electrical circuit connections between the operative elements within the envelope and an appropriate electrical circuit located without the envelope.

The switch 14, within the envelope of Figure 1, comprises a base member 12, of an insulation material, to which is secured a first bi-metallic element 16 and a second bi-metallic element 18. The first and second bi-metallic elements are substantially identical in size and are mounted upon said base in parallel planes to provide similar warping action of the elements with variations in temperature of the volume immediately adjacent the elements under "normal" conditions.

The first bi-metallic element is provided with an electrical heater element 20 formed of a resistive material such as Nichrome wire. An insulating member of a material such as mica, 22, is positioned between the heater element 20 and the first bi-metallic element 16, electrically insulating the bi-metallic element from the electrical circuit.

Heater element 20 is provided with terminal ends 24 and 26, which are connected to pin leads A and B by means of wires 28 and 30 respectively, providing an electrical circuit path from without the envelope to the heater element.

The switch structure further includes a spring yoke 32 secured to the second bi-metallic element 18. The spring yoke is provided with an aperture 34, through which is fitted a spring holder 36, the remote end whereof rests upon the second bi-metallic element 18. A spring element 38 formed with a tongue member 40, which may be advantageously formed as a cutout of the central portion of the spring element, and having a recess adapted to accept spring holder 36, as at X Figure [1] *2* is positioned to pivot about the spring holder arm 36. *The spring element 38 at the recess X seats on the spring holder 36 so that the latter forms a fulcrum for the spring element.* Tongue member 40 is positioned in a recess formed in the underside of yoke 32 to form a tensioning bias away from said tongue and toward said second bi-metallic element 18. A first contact point 42 is secured to spring element 38 at or near the extremity thereof remote from yoke 32, and is adapted to contact a second fixed contact point 44 in "normal" position, and a third fixed contact point 46, also mounted in base 12, when spring element 38 is flexed. Contactor 42 is provided with an electrical circuit path to the exterior of the envelope through tongue 40, spring yoke 32 and wire 48 and pin E. Contact point 44 is provided with an electrical circuit path to the exterior of the envelope through wire 50 and pin D, and contact point 46 is provided with an electrical circuit path to the exterior of the envelope through wire 52 and pin F.

Bi-metallic element 16 is further provided with a threaded screw member 53, which extends through a thread formed in said element and rests against one extremity of spring element 38, as at the extremity remote said contact point 42. Use of the threaded screw member permits adjustment of the delay action of said switch, as will hereinafter be described.

Retention of the base within the envelope may be accomplished by supplying the base member with a concave collar around which the envelope may be formed as shown at Y of Figure 1.

Figure 2:
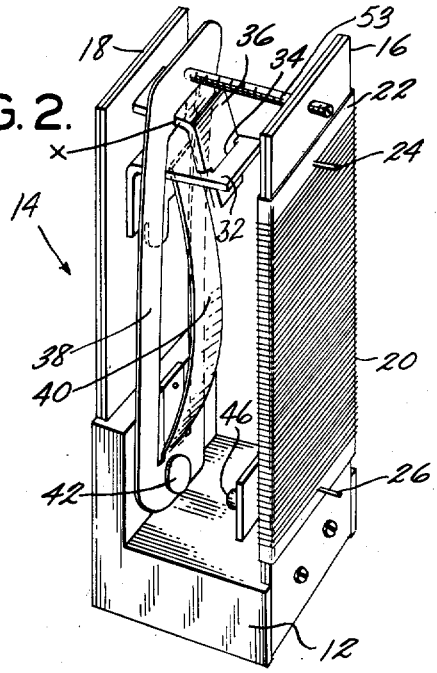
Figure 2 is a view in projection of the structure embodying the invention as illustrated in Figure 1.
Figure 3:
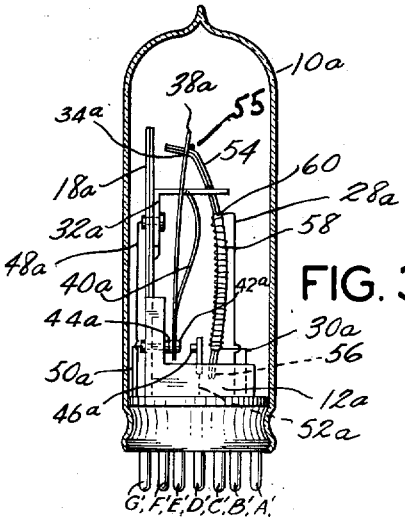
Figure 3 is a plan view of an alternate structure embodying the invention as enclosed in an envelope.

An alternate structure embodying the invention, as illustrated in Figure 3, comprises a sealed envelope 10a, having a plurality of pins A′, B′, C′, D′, E′ and F′ and G′ sealed through the envelope wall. A base member 12a, of an insulation material, is secured within the envelope as hereinbefore described with reference to Figure 1. A first bi-metallic element 54 is provided with a heater 58 coiled about said bi-metallic element and spaced therefrom by means of mica or asbestos spacers 60. A second bi-metallic element 18a is secured to said base at one extremity thereof in the same manner as heretofore described for the second bi-metallic element 18 of Figures 1 and 2. The first bi-metallic element 54 is anchored within base member 12a[,] *at 56,* and generally extends through an aperture 34a *in member 38a* of slightly larger size than said first bi-metallic element 54 and falls short of reaching bi-metallic element 18a. First bi-metallic element 54 *shown partially warped by the heater* is further provided with a projecting member 55, which is adapted to engage spring member 38a and cause the same to flex upon heating of said first bi-metallic element 54, said spring member 38a being of similar structure to spring member 38 of Figures 1 and 2, and is secured in position in a similar manner as said spring element 38. Correspondingly numbered parts of Figure 3 and Figures 1 and 2 perform like functions in like manners.

Figure 4:
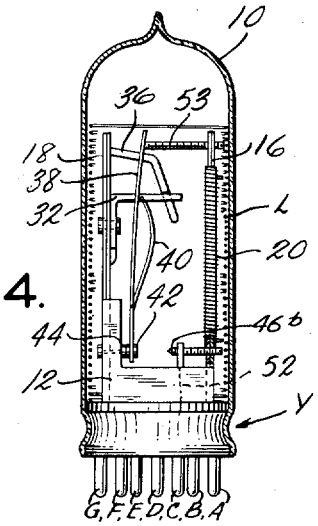
Figure 4 is a plan view of the invention including an inductance provided for frequency limit control.

The illustrative embodiment of the invention as shown in Figure 4 includes the internal switch structure of Figures 1 and 2, and further contains an additional adjustment feature and frequency control feature as hereinafter described.

Referring to Figure 4, an inductance L is secured within the envelope, and may be printed thereon if desired. The inductance is designed to present an impedance at a desired frequency. As the frequency of the current applied to said inductance is varied upward or higher, the inductive reactance of said coil increases and the current therethrough at a given frequency decreases. Operation of this feature with the device herein is more fully explained hereafter in a discussion of the operation of the device.

The feature of a further adjustment of the delay operation of said switch is accomplished by adjustable contact point 46b. Contact point 46b is formed as a threaded member which may preferably pass through an insulated threaded member affixed to first bi-metallic element 16.

Referring to the invention as illustrated in Figures 1 and 2, operation of the device is as follows: A current is caused to flow through heater element 20, causing bi-metallic element 16 to warp toward second bi-metallic element 18. The warping action of first bi-metallic element 16 forces threaded screw member [52] *53* against spring member 38, which under normal conditions is biased to retain first contact point 42 in contact with second contact point member 44. Upon application of a predetermined pressure upon said spring element 38 by means of threaded screw member 53, spring element 38 is caused to flex[,] *with respect to the fulcrum at holder 36*, snapping contact 42 out of engagement with contact point 44 and into contact with contact point 46. *Thus it will be seen that the first bi-metallic element 16 is the primary switch operator or driver and the second bi-metallic element 18 that carries the switch is for the purpose of ambient temperature compensation. As previously explained, the two bi-metallic elements 16 and 18 have similar warping action with variation in temperature of the surrounding medium so that a variation in ambient temperature has little or no effect on the relative spacing of the warped or free ends of the bi-metallic elements. Therefore, since the switch member 38 is mounted on and carried by the second or compensating bi-metallic element so that its mounting is positioned therewith according to variations in ambient temperature, the arrangement provides for uniform operation of the switch by the driver, or first, bi-metallic element 16 without reference to ambient temperature. Thus, the invention functions to eliminate ambient temperature errors which cause variable and unsatisfactory switch operation.* Utilization of the aforesaid structure results in a fast break switch and eliminates the chatter normally associated with switches operated by means of an inductive relay.

Contact points 42 and 44 may be arranged in a series electrical circuit including heater element 20 so as to cause the opening of the heater circuit as said contacts are taken out of engagement with one another. This feature permits the use and re-use of the device. In equipment which by its very nature is destroyed after the first action of the switch, connection is had to the heater directly, and the switch contact points may be utilized to perform another function.

The invention as embodied in Figure 3 of the drawing, operates in the following manner: The spring element 38a which fits through a slot on each side of yoke 32a (not shown in the drawing) pivots about said yoke, and is forced to flex as a result of the force exerted upon the upper extremity of said spring member 38a by projection 55 as a current is passed through heater element 58. In all other aspects, operation of the switch contact points 42, 44 and 46 is similar to operation of the switch contact points 42', 44' and 46' of Figures 1 and 2.

The invention as embodied in Figure 4 of the drawing, operates in similar fashion to that of Figures 1 and 2, and includes an additional adjustable feature, that formed by the adjustment of contact point 46b with respect to contact point 42 of Figure 4. The inductance is included within the envelope and may be formed upon the surface of the envelope as a printed circuit. Inclusion of the inductance in [a] series *in the heater* circuit is beneficial to maintain operation of the unit at a given frequency, and limits operation of the unit when the frequency increases materially, the increase in frequency leading to a decrease in current through the circuit, and consequently through the heater element[.], *thereby controlling the time delay switch accordingly for control purposes.*

The delay switch disclosed herein is believed by applicant to be beneficial in replacement of clock escapement mechanisms and synchronous motor mechanisms heretofore utilized for delay actuated devices utilized in the defense program.

Although I have described my invention as embodied in the structures illustrated, and have referred to an evacuated envelope, I desire it understood that the evacuated envelope may be replaced by an envelope filled with an inert gas under predetermined pressure if it is so desired. I further desire it understood that variations of my invention as embodied in the foregoing specification and drawing will readily be apparent to those skilled in the art, and I therefore intend that the claims be read and interpreted in the spirit and scope of the invention.

What is claimed is:

1. A delay switch including an envelope, a plurality of conductive lead wires sealed through a wall of said envelope, an insulation base member secured within said envelope, a first bi-metallic element and a second bi-metallic element each having one of their respective extremities secured to said base member, said other extremities extending away therefrom in the same direction and in substantially parallel planes, a heater element adjacent said first bi-metallic element and adapted to warp said first bi-metallic element toward said second bi-metallic element upon passage of a current through said heater element, conductive means between said heater element and a pair of conductive lead wires sealed through said envelope, a switch comprising a first contact point secured to said base member, a second contact resiliently secured to said second bi-metallic element, and a third contact point secured to said base member, said first, second and third contact points each having electrical conductive means therebetween and a conductive lead respectively sealed through said envelope, said second contact being disposed between said first and third contact points, and means secured to said first bi-metallic element in contact with said second bi-metallic element and adapted to move said second contact point out of engagement with said first contact point and into engagement with said third contact point upon passage of a predetermined current through said heater element.

2. A delay switch including an envelope, a plurality of conductive lead wires sealed through a wall of said envelope, an insulation base member secured within said envelope, a first bi-metallic element and a second bi-metallic element each having one of their respective extremities extending away from said base in substantially the same direction, a heater element adjacent said first bi-metallic element and adapted to warp said first bi-metallic element toward said second bi-metallic element, a snap action switch secured to said second bi-metallic element, a plurality of leads from said switch to said lead wires, and means secured to said first bi-metallic element for operating said switch as said first bi-metallic element is warped toward said second bi-metallic element.

[3. A delay switch including an envelope, a plurality of conductive lead wires sealed through a wall of said envelope, an insulation base member secured within said envelope, a first bi-metallic element and a second bi-metallic element each having one of their respective extremities extending away from said base in substantially the same direction, a heater element adjacent said first bi-metallic element and adapted to warp said first bi-metallic element to warp said second bi-metallic element, a threaded member mounted through a thread in said first bi-metallic element and adapted to operate said switch as said first bi-metallic element is warped toward said second bi-metallic element.]

4. A delay switch including an envelope, a plurality of conductive lead wires sealed through a wall of said envelope, an insulation base member secured within said envelope, a first bi-metallic element and a second bi-metallic element each having one of their respective extremities secured to said base member, said other extremities extending away therefrom in substantially parallel planes, a heater element adjacent said first bi-metallic element and adapted to warp said bi-metallic element toward said second bi-metallic element upon passage of a current through said heater element, conductive means between said heater element and a pair of wires sealed through said envelope, a switch comprising a first contact point secured to said base member, a second contact resiliently secured to said second bi-metallic element, and a third contact point, means for adjusting the distance between said third and second contact points, said second contact being disposed between said first and third contact points, and means secured to said first bi-metallic element, said means being adapted upon heating of said heater element to move said second contact point out of engagement with said first contact point and into engagement with said third contact point.

5. A delay switch including an envelope, a plurality of conductive lead wires sealed through a wall of said envelope, an insulation base member secured within said envelope, a first bi-metallic element and a second bi-metallic element each having one of their respective extremities secured to said base member, said other extremities extending away therefrom in substantially parallel planes, a heater element adjacent said first bi-metallic element and adapted to warp said first bi-metallic element toward said second bi-metallic element, conductive means between said heater and said conductive wires sealed through said envelope wall, a switch comprising a first contact point secured to said base member, a second contact resiliently secured to said second bi-metallic element, said first and second contact points being in contact with one another, and means secured to said first bi-metallic element and adapted to move said first contact point out of engagement with said second contact point upon passage of a predetermined current through said heater element.

6. A delay switch including an envelope, a plurality of conductive lead wires sealed through the wall of said envelope, an insulation base member secured within said envelope, a first bi-metallic element and a second bi-metallic element each having one of their extremities secured to said base member, said other extremities extending away therefrom in the same direction and in substantially parallel planes, a heater element adjacent said first bi-metallic element and adapted to warp said first bi-metallic element upon passage of a current through said heater element, conductive means between the extremities of said heater element and a pair of the conductive lead wires sealed through the wall of said envelope, a switch comprising a first contact point secured to said base member, a second contact point resiliently secured to said second bi-metallic element, and a third contact point secured to said base member, said second contact point being disposed between said first and third contact points, a spring yoke secured to said second bi-metallic element proximate the free extremity thereof, said spring yoke including an aperture therein, a spring holder extending through said aperture and having one extremity thereof resting against said second bi-metallic element, a spring element including a tongue and an aperture, said spring holder extending through said aperture, and said tongue at its free extremity being positioned against said yoke and applying a tensioning bias upon said spring member element, and a member extending from said first bi-metallic element proximate the free extremity thereof, said member being positioned to move, upon movement of said first bi-metallic element, said spring member and snap said second switch contactor to another position.

*7. A delay switch comprising an envelope having a plurality of conductive lead wires sealed through a wall thereof, a first bi-metallic element and a second bi-metallic element mounted within said envelope, said elements having substantially the same order of thermal expansion and extending generally in parallel directions and each secured at one end in fixed relation to said envelope so that the free ends thereof are in spaced opposing relation to each other, a heater element adjacent said first bi-metallic element arranged to cause warping of the free end thereof toward the free end of said second bi-metallic element, said second bi-metallic element being influenced primarily by ambient temperature so as to warp in the same direction as the first element for a given change in ambient temperature, a movable switch member having a mounting carried by said second bi-metallic element adjacent the free end thereof so as to be positioned therewith, a plurality of coacting switch contacts, one of which is mounted on said switch member and another being mounted in fixed relation to said envelope, means for connecting the movable and fixed contacts and said heater element to said lead wires, and means operatively relating said first bi-metallic element to said switch member for causing the movable contact to coact in snap action with the fixed contact, said second bi-metallic element causing positioning of said switch member mounting so as to compensate for ambient temperature.*

*8. A delay switch comprising a first bi-metallic element and a second bi-metallic element, said elements having substantially the same order of thermal expansion and each fixed at one end and extending therefrom generally in parallel directions with the free ends thereof in spaced relation, a heater element adjacent said first bi-metallic element arranged to cause warping of the free end thereof toward the free end of said second bi-metallic element, said second bi-metallic element being influenced primarily by ambient temperature so as to warp in the same direction as the first element for a given change in ambient temperature, a movable snap-switch member having a fulcrum of the knife edge type mounted on and carried by said second bi-metallic element adjacent the free end thereof so as to be positioned therewith, a plurality of coacting switch contacts, one of which is mounted on said switch member and another being in fixed relation thereto, and means operatively relating said first bi-metallic element to said switch member for causing the movable contact to coact in snap action with respect to the fixed contact, said second bi-metallic element causing positioning of said fulcrum so as to compensate for ambient temperature.*

*9. A delay switch comprising an envelope having a plurality of conductive lead wires sealed through a wall thereof, a first bi-metallic element and a second bi-metallic element mounted within said envelope, said elements having substantially the same order of thermal expansion and each secured at one end in fixed relation to said envelope and extending therefrom generally in parallel directions so that the free ends thereof are in*

*spaced relation, a heater element adjacent said first bi-metallic element arranged to cause warping of the free end thereof toward the free end of said second bi-metallic element, said second bi-metallic element being influenced primarily by ambient temperature so as to warp in the same direction as the first element for a given change in ambient temperature for temperature compensation, a movable switch member including a snap-over spring pivotally mounted with respect to a fulcrum on said second bi-metallic element adjacent the free end thereof so that said fulcrum is positioned therewith, a plurality of coacting switch contacts, one of which is mounted on said switch member and another being mounted in fixed relation to said envelope, means for connecting the movable and fixed contacts and said heater element to said lead wires, and an operative connection between said first bi-metallic element and said switch member for causing operation of said snap-over spring and coaction of the movable and fixed contacts, said second bi-metallic element causing positioning of said fulcrum so as to compensate for ambient temperature.*

*10. A delay switch comprising a stationary base, a first bi-metallic element and a second bi-metallic element, said elements having substantially the same order of thermal expansion and arranged so as to extend generally in the same direction in spaced relation to each other and each element being fixed with respect to said stationary base at one end so that the free ends are movable relative to each other and the fixed ends are stationary, a heater element adjacent said first bi-metallic element arranged to cause warping of the free end thereof relative to the free end of said second bi-metallic element, said second bi-metallic element being influenced primarily by ambient temperature so as to warp in the same direction as said first element for a given change in ambient temperature, a movable switch member having a fulcrum support mounted on and carried by one of said bi-metallic elements adjacent the free end thereof so as to be positioned therewith, a plurality of coacting fixed and movable contacts positioned in proximity to the fixed ends of said elements and controlled by the other switch member, and means operatively connecting said first bi-metallic element to said switch member for causing the movable contact to coact in snap action with the corresponding fixed contact, said one of said bi-metallic elements causing positioning of said fulcrum support so as to compensate for ambient temperature.*

References Cited in the file of this patent or the original patent

UNITED STATES PATENTS

| | | |
|---|---|---|
| 1,230,172 | Kiefer | June 19, 1917 |
| 1,513,247 | James | Oct. 28, 1924 |
| 1,571,104 | Baker | Jan. 26, 1926 |
| 1,995,877 | Woodworth | Mar. 26, 1935 |
| 2,035,426 | Field | Mar. 24, 1936 |
| 2,236,699 | Riche | Apr. 1, 1941 |
| 2,302,440 | Hardy | Nov. 17, 1942 |
| 2,376,092 | Shaw et al. | May 15, 1945 |
| 2,392,498 | Osterheld | Jan. 8, 1946 |
| 2,484,112 | Moorhead | Oct. 11, 1949 |
| 2,489,391 | Thompson | Nov. 29, 1949 |
| 2,494,863 | Dietz | Jan. 17, 1950 |
| 2,599,473 | Miller | June 3, 1952 |
| 2,610,273 | Judson | Sept. 9, 1952 |
| 2,612,543 | Alexander | Sept. 30, 1952 |
| 2,689,288 | Wells | Sept. 14, 1954 |